Patented Dec. 11, 1945

2,390,835

UNITED STATES PATENT OFFICE 2,390,835

METHOD OF ALKYLATING AROMATIC COMPOUNDS

George Felix Hennion, South Bend, Ind., and Norbert Francis Toussaint, Wilmington, Del., assignors to E. I. du Pont de Nemours & Company, Wilmington, Del., a corporation of Delaware No Drawing. Application April 30, 1940,
Serial No. 332,476

6 Claims. (Cl. 260—671)

This invention relates to a new method of alkylating aromatic compounds and more particularly to a new method for condensing an aromatic compound with an aliphatic alcohol containing 3 or more carbon atoms.

It is an object of this invention to develop a new method of alkylation which gives satisfactory yields of alkylated products. A further object is to provide a novel method of alkylation which makes it unnecessary to use pressure equipment or excessive amounts of condensing agent. A still further object is to develop a superior process for condensing an aliphatic alcohol with an aromatic compound. Other objects will appear hereinafter.

These objects are accomplished by the following invention according to which an organic compound containing an aromatic nucleus is alkylated by reacting said organic compound with an aliphatic alcohol containing at least 3 carbon atoms in the presence of boron trifluoride and an assistant condensing agent selected from the group consisting of phosphorus pentoxide, sulfuric acid, benzenesulfonic acid, boric oxide, and boron trifluoride dihydrate. The alkylation products thus obtained can be separated into their constituents by simple fractionation.

The following examples illustrate but do not limit the invention. All parts are given by weight except where it may be otherwise noted.

Example I.—Octyl benzene 260 parts of octyl alcohol was cooled to 0° C. with agitation and 71 parts of $P_2O_5$ was rapidly introduced with continued cooling. The temperature rose to 70° C. even with good external cooling. After the temperature had been reduced to 10° C., 78 parts of benzene was added and $BF_3$ was introduced rapidly at 0–10° C. for 2½ hours with continued cooling. The reaction mass was then warmed to 70–80° C. and $BF_3$ was passed in for a further two hours. At this time the reaction mass separated into two layers, the lower a dark red and the upper a water white oil. At this point $BF_3$ absorption was complete as was indicated by the fact that the $BF_3$ passed through the flask without absorption. The reaction temperature was then raised to 90–95° C. and $BF_3$ was passed in slowly for 1½ hours. The product was then allowed to separate, and the upper layer of octyl benzene and excess benzene and octyl alcohol was removed and fractionated. The yield of octyl benzene (B. P. 71–78° C./1 mm.) was 20.5%, of dioctyl benzene (B. P. 159° C./1 mm.) was 30.8%, and of tri-octyl benzene (B. P. greater than 176° C./1 mm.) was 8.7%.

Example II.—Decyl benzene

In a manner similar to Example I, 475 parts of decyl alcohol was reacted with 234 parts of benzene and 106 parts of $P_2O_5$ in the presence of $BF_3$. The reaction pursued a similar course and the hydrocarbon layer which was water white was separated as in Example I. On fractionation there was obtained a yield of 29.7% of mono-decyl benzene (B. P. 148–151° C./10 mm.) and 14.5% of didecyl benzene (B. P. greater than 230° C./10 mm.).

Example III.—Dodecyl benzene

In a manner similar to Example I, 931 parts of n-dodecyl alcohol was reacted with 780 parts of benzene and 180 parts of $P_2O_5$ in the presence of $BF_3$. The reaction ran a similar course, and the oily layer on fractionation yielded 13% of mono-dodecyl benzene (B. P. 170–190° C./10 mm.) and 6.3% of di-dodecyl benzene (B. P. greater than 241° C./10 mm.).

Example IV.—2-ethyl-hexyl benzene

In a manner similar to Example I, 390 parts of 2-ethyl-hexanol was reacted with 117 parts of benzene and 106 parts of $P_2O_5$ in the presence of $BF_3$. The yield of mono-2-ethyl-hexyl benzene (B. P. 114–139° C./10 mm.) was 11.2%, and the yield of di-2-ethyl-hexyl benzene (B. P. greater than 190° C. at 10 mm.) was 26.5%.

Example V.—Mixture of hexyl and heptyl benzenes

In a manner similar to Example I, 324 parts of a mixture of aliphatic alcohols containing 6 and 7 carbon atoms obtainable in the methyl alcohol synthesis was reacted with 117 parts of benzene and 106 parts of $P_2O_5$ in the presence of $BF_3$. On fractionation the oil layer gave 10.3% of mono-alkylated benzene (B. P. 79–87° C./10 mm.), 17.9% of a mixture of mono- and dialkylated benzenes (B. P. 87–158° C.) and 9.4% of tetra-alkylated benzene (B. P. greater than 200° C./10 mm.).

Example VI.—Decyl xylene

In a manner similar to Example I, 486 parts of n-decyl alcohol was reacted with 159 parts of meta-xylene and 106 parts of $P_2O_5$ in the presence of $BF_3$. On fractionation there was obtained 20.3% of decyl xylenes (B. P. 155 to 174°

C./10 mm.) and 19.7% of didecyl xylenes (B. P. greater than 234° C./10 mm.).

*Example VII.—Octyl naphthalene*

In a manner similar to Example I, 293 parts of octyl alcohol was reacted with 192 parts of naphthalene and 53 parts of $P_2O_5$ in the presence of $BF_3$. On fractionation there was obtained 36.7% of mono-octyl naphthalene (B. P. 183–203° C./6 mm.) and 29.8% of di-octyl naphthalene (B. P. 228–238° C./6 mm.).

*Example VIII.—Dodecyl naphthalene*

In a manner similar to Example I, 420 parts of n-dodecyl alcohol was reacted with 192 parts of naphthalene and 53 parts of $P_2O_5$ in the presence of $BF_3$. On fractionation there was obtained 17.8% of mono-dodecyl naphthalene (B. P. 192–215° C./5 mm.) and 23.4% of di-dodecyl naphthalene (B. P. greater than 282° C. at 5 mm.).

*Example IX.—Octyl methyl naphthalene*

In a manner similar to Example I, 420 parts of n-octyl alcohol was reacted with 213 parts of beta-methyl naphthalene and 106 parts of $P_2O_5$ in the presence of $BF_3$. On fractionation the product yielded 20.8% of mono-octyl beta-methyl naphthalene (B. P. 196–207° C./10 mm.) and 39.2% of dioctyl beta-methyl naphthalene (B. P. greater than 234° C./10 mm.).

*Example X.—Decyl tetrahydronaphthalene*

In a manner similar to Example I, 237 parts of decyl alcohol was reacted with 198 parts of tetra-hydro-naphthalene and 53 parts of $P_2O_5$ in the presence of $BF_3$. There was obtained 63.8% of decyl tetrahydronaphthalene (B. P. greater than 128° C./10 mm.).

*Example XI.—Dodecyl diphenyl oxide*

In a manner similar to Example I, 550 parts of n-dodecyl alcohol was reacted with 510 parts of diphenyl oxide and 106 parts of $P_2O_5$ in the presence of $BF_3$. On fractionation there was obtained 66% of mono-dodecyl diphenyl oxide (B. P. greater than 180° C./5 mm.).

*Example XII.—Isopropyl benzene*

156 parts of benzene and 30 parts of n-propyl alcohol were placed in a container and cooled. Then boron fluoride was admitted until 0.5 mol (34 parts) had been absorbed. Then 17.7 parts of phosphorus pentoxide was added quickly and the mixture warmed slowly to reflux temperature. It became homogeneous and on continued heating the solution became turbid and stratified into two layers. Further heating caused gradual diminution of the volume of the lower layer. After heating three hours the layers were separated and the upper one washed, neutralized, dried and fractionally distilled. There was obtained a 58.5% yield of mono-isopropyl benzene and a 13% yield of di-isopropyl benzene.

*Example XIII.—Isopropyl benzene*

An experiment run similar to Example XII using 0.5 mol of isopropyl alcohol, 2 mols of benzene, 0.5 mol of $BF_3$ and 0.125 mol of phosphorus pentoxide gave a yield of 37.5% of isopropyl benzene and 19.8% of di-isopropyl benzene.

*Example XIV.—Butyl benzene*

Two mols (156 parts) of benzene and 0.5 mol (37 parts) of n-butyl alcohol were placed in a flask equipped with a reflux condenser and a motor-driven mercury-sealed stirrer. The solution was cooled in a bath of cold water and boron trifluoride admitted until 0.5 mol (34 parts) had been absorbed. Then 0.125 mol (17.7 parts) of phosphorus pentoxide was added quickly. The mixture was warmed slowly, with stirring, to reflux temperature and soon became homogeneous. On continued heating the solution became turbid and stratified into two layers when agitation was discontinued. Further heating caused gradual diminution in the volume of the lower layer. After heating for three hours the layers were separated, and the upper one washed, neutralized, dried and fractionally distilled. There was thus obtained 50 parts (74.5%) of secondary-butylbenzene and 3 parts (6.3%) of para-di-secondary-butylbenzene.

*Example XV.—Tertiary butyl benzene*

Following procedure similar to that set forth in Example XIV but employing 0.5 mol of isobutyl alcohol, 2 mols of benzene, 0.5 mol of $BF_3$, and 0.12 mol of phosphorus pentoxide gave a 56.7% yield of tertiary butyl benzene and an 11.8% yield of di-tertiary butyl benzene.

*Example XVI.—Tertiary butyl benzene*

A similar experiment to Example XIV but employing 0.5 mol of tertiary butyl alcohol, 2 mols of benzene, 0.25 mol of $BF_3$, and 0.12 mol of phosphorus pentoxide gave a 24.6% yield of mono tertiary butyl benzene. In this reaction a polymer, presumably tri-isobutylene, was also formed.

*Example XVII.—Amyl benzene*

Another experiment was run similar to Example XIV except 0.5 mol of n-amyl alcohol, 4 mols of benzene, 0.5 mol of $BF_3$, and 0.12 mol of phosphorus pentoxide were used. The reaction mixture was heated for 6 hours in place of 3 hours as in Example XIV, and an 85% yield of mono-amyl-benzene was obtained.

*Example XVIII.—Amyl benzene*

When two mols of n-amyl alcohol were heated for 2 hours with 4 mols of benzene in the presence of 2 mols of boron trifluoride and 0.5 mol of phosphorus pentoxide, a 66.4% yield of mono-amyl-benzene and a 14.2% yield of di-amyl-benzene was obtained.

*Example XIX.—Octyl benzene*

When one mol of n-octyl alcohol was heated for 3 hours with 8 mols of benzene in the presence of 1 mol of boron trifluoride and 0.25 mol of phosphorus pentoxide, a 79% yield of mono-octyl benzene was obtained.

*Example XX.—Dodecyl benzene*

0.5 mol of n-dodecyl alcohol was heated for 16 hours with 4 mols of benzene in the presence of 0.5 mol of boron trifluoride and 0.25 mol of phosphorus pentoxide. A 33.3% yield of mono-dodecyl benzene was thus obtained.

*Example XXI.—Amyl benzene*

25 parts of 94% sulfuric acid was added to a solution of 44 parts (0.5 mol) of n-amyl alcohol in 312 parts (4 mols) of benzene previously saturated with 34 parts (0.5 mol) of boron fluoride. After heating for 5½ hours the upper layer was separated, washed and fractionated as in Example XIV. Distillation gave 59.2 parts (80%) of s-amyl-benzene.

Example XXII.—Dodecyl benzene 0.5 mol of n-dodecyl alcohol was heated for 10 hours with 2 mols of benzene in the presence of 1 mol of 94% sulphuric acid and 0.5 mol of boron trifluoride. A 46.4% yield of mono-dodecyl benzene was thus obtained.

Example XXIII.—Butyl benzene

A 63% yield of mono-butyl-benzene was obtained when 0.5 mol of n-butyl alcohol was heated for 4 hours with 2 mols of benzene in the presence of 0.5 mol of boron trifluoride and 0.5 mol of benzene sulphonic acid.

Example XXIV.—Dodecyl benzene 0.5 mol of n-dodecyl alcohol was heated for 10 hours with 2 mols of benzene in the presence of 0.5 mol of boron trifluoride and 0.5 mol of benzene sulphonic acid. A 44.6% yield of mono-dodecyl benzene was thus obtained.

The benzene sulphonic acid used in the two preceding examples may be generated in situ by passing boron trifluoride into a solution of 1 mol of benzene and 1 mol of 94% sulphuric acid. This gives complete sulphonation, and the product may be used without further purification as a catalyst in this alkylation reaction.

In place of phosphorus pentoxide, we may use a cheaper product which contains phosphorus pentoxide dissolved in phosphoric acid. We may also use boric oxide or boron trifluoride dihydrate in place of phosphorus pentoxide.

In place of the alcohols which are mentioned in the examples, we may use hexyl alcohol, cyclohexanol, methyl cyclohexanol, nonyl alcohol, etc.

It is apparent from the examples that a wide variety of aromatic compounds can be alkylated by the methods disclosed above. In accordance with this invention it is possible to alkylate such aromatic compounds as cymene, anthracene, phenanthrene, fluorene, methyl benzoate, dimethyl aniline, acetophenone, carbazole, thianthrene, phenol, cresol, naphthol, anisole, phenetole, brombenzene, etc.

When aromatic hydrocarbons are alkylated by reaction with aliphatic alcohols in the presence of boron trifluoride and phosphorus pentoxide, the yields are greater than those attained when boron trifluoride and phosphorus pentoxide are used individually and are greater than what would be expected from the additive use of boron trifluoride and phosphorus pentoxide.

Resort may be had to such modifications and equivalents as fall within the spirit and scope of the appended claims. Claims covering the alkylation of an organic compound containing an aromatic nucleus with an aliphatic alcohol containing at least 3 carbon atoms in the presence of boron trifluoride and an assistant acidic condensing agent selected from the group consisting of sulfuric acid and benzenesulfonic acid have been divided out of this application and placed in applicants' co-pending divisional application, Serial No. 487,658, filed May 19, 1943.

We claim:

1. A process for alkylating an organic compound containing an aromatic nucleus which comprises reacting said compound with an aliphatic alcohol containing at least 3 carbon atoms in the presence of boron trifluoride and an inorganic acid anhydride selected from the group consisting of phosphorus pentoxide and boric oxide.

2. A process for alkylating an organic compound containing an aromatic nucleus which comprises reacting said compound with an aliphatic alcohol containing at least 3 carbon atoms in the presence of boron trifluoride and phosphorus pentoxide.

3. A process for alkylating an aromatic hydrocarbon of the benzene and naphthalene series which comprises reacting said hydrocarbon with an aliphatic alcohol containing at least 3 carbon atoms in the presence of boron trifluoride and an inorganic acid anhydride selected from the group consisting of phosphorus pentoxide and boric oxide.

4. A process for alkylating an aromatic hydrocarbon of the benzene and naphthalene series which comprises reacting said hydrocarbon with an aliphatic alcohol containing at least 3 carbon atoms in the presence of boron trifluoride and phosphorus pentoxide.

5. A process for alkylating benzene which comprises reacting benzene with an aliphatic alcohol containing at least 3 carbon atoms in the presence of boron trifluoride and an inorganic acid anhydride selected from the group consisting of phosphorus pentoxide and boric oxide.

6. A process for alkylating benzene which comprises racting benzene with an aliphatic alcohol containing at least 3 carbon atoms in the presence of boron trifluoride and phosphorus pentoxide.

GEORGE FELIX HENNION.
NORBERT FRANCIS TOUSSAINT.